United States Patent
Sato

(10) Patent No.: US 9,685,892 B2
(45) Date of Patent: Jun. 20, 2017

(54) BRUSHLESS MOTOR CONTROL DEVICE AND DIAGNOSTIC PROCESSING METHOD FOR SAME

(71) Applicant: Panasonic Intellectual Property Management Co., Ltd., Osaka (JP)

(72) Inventor: Daisuke Sato, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/301,723

(22) PCT Filed: Mar. 5, 2015

(86) PCT No.: PCT/JP2015/001177
§ 371 (c)(1),
(2) Date: Oct. 4, 2016

(87) PCT Pub. No.: WO2015/159474
PCT Pub. Date: Oct. 22, 2015

(65) Prior Publication Data
US 2017/0117831 A1    Apr. 27, 2017

(30) Foreign Application Priority Data

Apr. 17, 2014  (JP) ................. 2014-085164

(51) Int. Cl.
*H02P 6/16* (2016.01)
*H02P 6/12* (2006.01)
(Continued)

(52) U.S. Cl.
CPC .................. *H02P 6/12* (2013.01); *H02P 3/18* (2013.01); *H02P 27/08* (2013.01)

(58) Field of Classification Search
USPC ............................. 318/400.04, 454, 400.13
See application file for complete search history.

(56) References Cited

U.S. PATENT DOCUMENTS 6,140,792 A * 10/2000 Kameyama ............... H02P 8/32
                                                          318/448
2013/0278197 A1  10/2013 Sasaki et al.
(Continued)

FOREIGN PATENT DOCUMENTS

EP     2750283       7/2014
JP     8-230651      9/1996
(Continued)

OTHER PUBLICATIONS

International Search Report of PCT application No. PCT/JP2015/001177 dated Jun. 9, 2015.
(Continued)

*Primary Examiner* — Jorge L Carrasquillo
(74) *Attorney, Agent, or Firm* — McDermott Will & Emery LLP

(57) ABSTRACT

The brushless motor control device according to the present invention includes a drive controller, current detection circuits, AD converter circuits, a clock generation circuit, a pulse output circuit, and an RC filter. The drive controller generates a driving signal for driving a brushless motor. The current detection circuits each detect a current of the brushless motor. The AD converter circuits are each connected to a different one of the current detection circuits. The clock generation circuit outputs a clock pulse. The pulse output circuit outputs a pulse signal according to the clock pulse. The RC filter receives the pulse signal. The RC filter is formed of a resistor and a capacitor connected in series. A pull-up resistor connecting to a predetermined power supply is connected to an intermediate connection point between the resistor and the capacitor. The intermediate connection point is connected to the AD converter circuits. Based on output values form the AD converter circuits, it is determined whether the clock generation circuit, the AD con- (Continued)

verter circuits, and the current detection circuit are in an abnormal condition.

9 Claims, 3 Drawing Sheets

(51) Int. Cl.
  *H02P 27/08* (2006.01)
  *H02P 3/18* (2006.01)

(56) References Cited

U.S. PATENT DOCUMENTS

2014/0001999 A1    1/2014  Sato
2014/0145665 A1*   5/2014  Shouji .................. B60L 15/025
                                                              318/503

FOREIGN PATENT DOCUMENTS

| JP | 2004-343878 A | 12/2004 |
| JP | 2006-180610   | 7/2006  |
| JP | 2007-074791   | 3/2007  |
| JP | 2011-155708   | 8/2011  |
| JP | 2013-046488   | 3/2013  |
| WO | 2009/125683   | 10/2009 |
| WO | 2013/027348   | 2/2013  |

OTHER PUBLICATIONS

The Extended European Search Report dated Apr. 13, 2017 for the related European Patent Application No. 15779720.0.

* cited by examiner

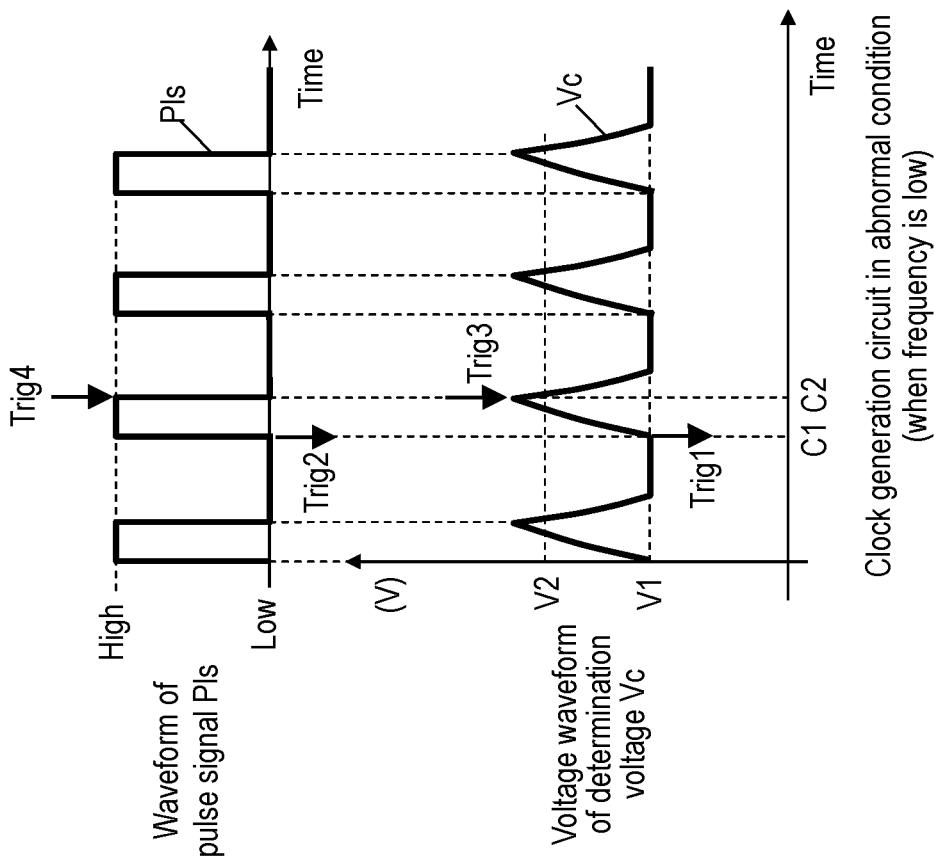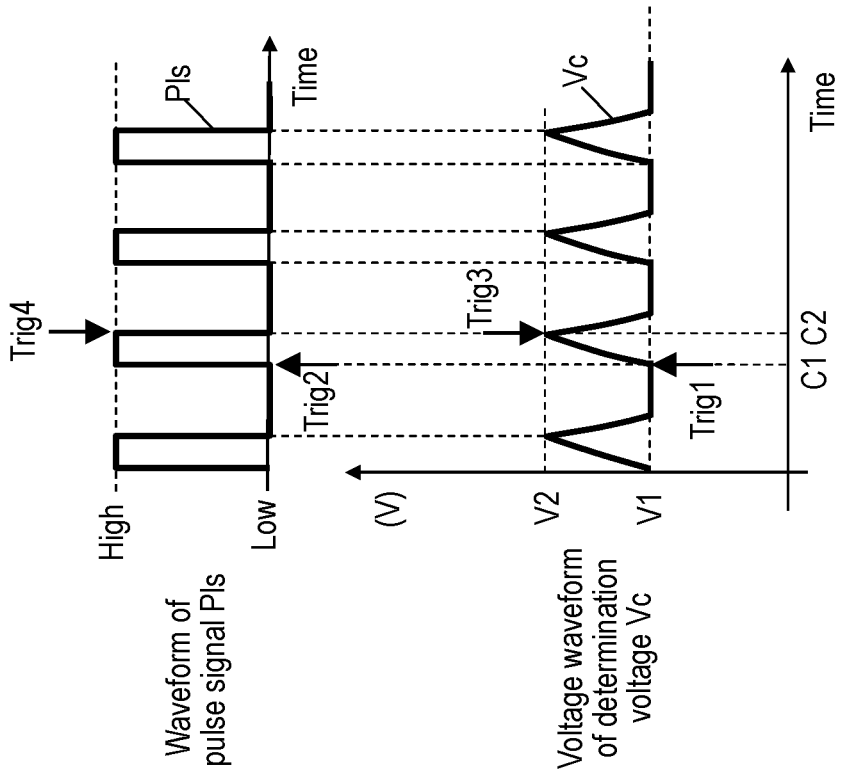

BRUSHLESS MOTOR CONTROL DEVICE AND DIAGNOSTIC PROCESSING METHOD FOR SAME

This application is a U.S. national stage application of the PCT international application PCT/JP2015/001177 filed on Mar. 5, 2015, which claims the benefit of foreign priority of Japanese patent application No. 2014-085164 filed on Apr. 17, 2014, the contents all of which are incorporated herein by reference.

TECHNICAL FIELD

The present invention relates to a brushless motor control device for driving and controlling a brushless motor and a diagnostic processing method for the brushless motor control device. More particularly, the present invention relates to a brushless motor control device capable of diagnosing circuits of a motor control circuit that when in an abnormal condition cause errors in a rotational speed and torque to increase relative to a command so that the errors are prevented from increasing, and to a diagnostic processing method for the brushless motor control device.

BACKGROUND ART

In recent years, a brushless motor is used in a cooling fan commonly used for, for example, a refrigerator, because the brushless motor is long-life and meets a demand for energy efficiency. Such a cooling fan needs to be controlled to satisfy, for example, required airflows and driving sounds emitted in its surrounding area, which are preset values corresponding to air temperatures and temperatures of an object to be cooled by the cooling fan. It is known that variations in the airflows depend on variations in a rotational speed of a motor mounted to an impeller, and that the driving sounds depend on running torque of the motor.

Conventionally, a sensorless three-phase brushless motor controlled to be driven using pulse width modulation (hereinafter referred to as "PWM" as appropriate) is controlled by, for example, a brushless motor control device such as that described below. With the control device, a rotated position of the motor is first estimated from values of currents flowing through coils each in a different one of phases. An actual rotational speed of the motor is then calculated from an amount of change in the rotated position per unit of time. Then, according to the calculated actual rotational speed, a switching pulse width for a metal-oxide-semiconductor field-effect transistor (MOS-FET) device is controlled, the MOS-FET device mounted to an inverter circuit that enables the motor to be driven using PWM.

With this configuration, if there is an error in a current detection circuit for detecting values of currents flowing through the coils, an analog-digital (AD) converter circuit for enabling an output from the current detection circuit to be input to a microcomputer, or a clock generation circuit for generating an unit of time, an error also occurs in a calculated actual rotational speed and calculated torque, resulting in differences between the actual rotational speed and the torque and target values.

There has been proposed a conventional method for determining whether an error is occurring in a clock generation circuit, that is, the clock generation circuit is in an abnormal condition. The method includes, for example, inputting, to an RC filter, a pulse voltage generated based on a clock pulse at predetermined intervals, and determining that the clock generation circuit is in an abnormal condition if voltages at predetermined sampling timings fall outside a predetermined range (for example, see, PTL 1).

However, the conventional configuration, which can determine whether the clock generation circuit is in an abnormal condition, cannot determine whether a current detection circuit and an AD converter circuit are in an abnormal condition. Therefore, the method cannot prevent increased errors in a rotational speed and torque due to an abnormal condition of the AD converter circuit and the current detection circuit, and thus cannot prevent increased variations in an airflow of a cooling fan and a driving sound emitted by the cooling fan. To make allowance for the increased variations, a large motor is conventionally used for the cooling fan. The variations can also be addressed by adding a plurality of complex diagnostic circuits. This, however, requires a large microcomputer because a small microcomputer, which has fewer pins, cannot achieve a circuit configuration, resulting in increased cost.

CITATION LIST

Patent Literature

PTL 1: Unexamined Japanese Patent Publication No. H08-230651

SUMMARY

A brushless control device according to the present invention controls and drives a brushless motor so that the brushless motor rotates according to an external command. The brushless motor control device according to the present invention includes a drive controller, a plurality of current detection circuits, a plurality of AD converter circuits, a clock generation circuit, a pulse output circuit, and an RC filter. The drive controller generates a driving signal for driving a brushless motor. Each of the current detection circuits detects a current value in a different phase of the brushless motor. Each of the plurality of AD converter circuits is connected to a different one of the current detection circuits each for a different one of the phases. The clock generation circuit outputs a clock pulse serving as a reference operational period. The pulse output circuit outputs a pulse signal according to the clock pulse. The RC filter receives the pulse signal. The RC filter is formed of a resistor and a capacitor connected in series. A pull-up resistor connecting to a predetermined power supply is connected to an intermediate connection point between the resistor and the capacitor. The intermediate connection point is connected to the plurality of AD converter circuits.

Based on output values form the plurality of AD converter circuits, it is determined whether the clock generation circuit, the AD converter circuits, and the current detection circuit are in an abnormal condition. If so, rotation of the motor, for example, is stopped.

A diagnostic processing method according to the present invention is for a brushless motor control device including a drive controller, a plurality of current detection circuits, a plurality of AD converter circuits, and a clock generation circuit. The drive controller generates a driving signal for driving a brushless motor. Each of the current detection circuits detects a current in a different phase of the brushless motor. Each of the plurality of AD converter circuits is connected to a different one of the current detection circuits each for a different one of the phases. The clock pulse circuit outputs a clock pulse serving as a reference operational period. In the diagnostic processing method according to the present invention, a resistor and a capacitor are connected in series to form an RC filter. A pull-up resistor connecting to a predetermined power supply is connected to an intermediate connection point between the resistor and the capacitor. The intermediate connection point is connected to the plurality of AD converter circuits. A pulse signal generated based on a clock pulse is applied to the RC filter, and voltages at the intermediate connection point are converted to digital signals by the plurality of AD converter circuits. The diagnostic processing method according to the present invention diagnoses the plurality of AD converter circuits and the clock generation circuit, based on the output values obtained through the conversion.

The present invention can prevent increased errors in a rotational speed and torque due to an abnormal condition of the AD converter circuits, the clock generation circuit, or the current detection circuit, thus preventing increased variations in an airflow of a cooling fan and a driving sound emitted by the cooling fan. Accordingly, a large motor does not need to be used for the cooling fan to make allowance for the variations, achieving reduction in both size and weight for the cooling fan. Additionally, the present invention can be easily achieved by using a small microcomputer, which has fewer pins, and an inexpensive circuit configuration, instead of adding a plurality of complex diagnostic circuits, thus limiting costs of circuits.

BRIEF DESCRIPTION OF DRAWINGS

FIG. 2A is a timing diagram illustrating a waveform of pulse signal Pls to be applied to an RC filter of the brushless motor control device, a waveform of determination voltage Vc, and timings at which AD converter circuits read voltage Vc, the waveforms and the timings being obtained when a clock generation circuit is in a normal condition.

FIG. 2B is a timing diagram illustrating a waveform of pulse signal Pls to be applied to the RC filter of the brushless motor control device, a waveform of determination voltage Vc, and timings at which the AD converter circuits read voltage Vc, the waveforms and the timings being obtained when the clock generation circuit is in an abnormal condition.

DESCRIPTION OF PREFERRED EMBODIMENT

An exemplary embodiment of the present invention is described below with reference to the accompanying drawings.

Exemplary Embodiment

Figure 1:
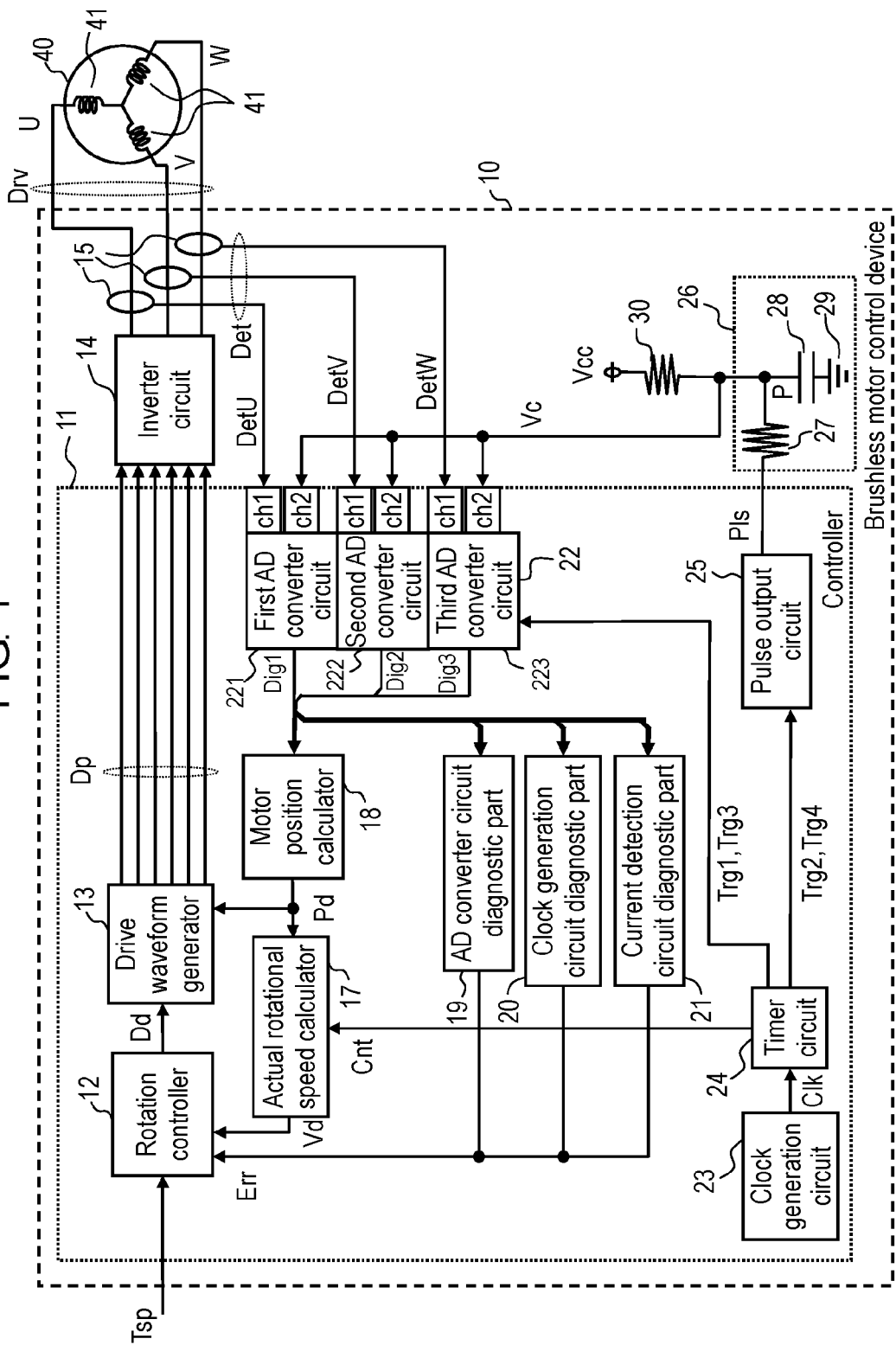
FIG. 1 is a block diagram illustrating a configuration of a brushless motor control device according to an exemplary embodiment of the present invention.

FIG. 1 is a block diagram illustrating a configuration of brushless motor control device 10 according to the exemplary embodiment of the present invention. FIG. 1 illustrates an example configuration of brushless motor control device 10 according to the present exemplary embodiment, with brushless motor 40 connected to brushless motor control device 10. With this configuration, brushless motor control device 10 controls driving of brushless motor 40 so that brushless motor 40 rotates according to an external command.

Brushless motor 40 includes a stator having coils 41 each formed by winding a wire around a stator core, and a rotor which rotates about a shaft when coils 41 are being energized to drive. In the present exemplary embodiment, a description is given of an example in which brushless motor 40 includes coils 41 in three phases (U-phase, V-phase, and W-phase), and brushless motor control device 10 uses driving signal Dry obtained through pulse width modulation (PWM) to cause the phases to be driven in rotation.

As illustrated in FIG. 1, brushless motor control device 10 includes controller 11, inverter circuit 14, current detection circuits 15, and RC filter 26.

Brushless motor control device 10 receives, as one of commands from, for example, an external high-order controller (not illustrated), rotational speed/torque command Tsp, which is a signal for specifying a rotational speed and an amount of torque. Brushless motor control device 10 generates driving signal Dry such that brushless motor 40 rotates according to the rotational speed and torque specified by rotational speed/torque command Tsp. Brushless motor control device 10 applies driving signal Dry to each of coils 41, thus controlling rotation of brushless motor 40.

To enable brushless motor control device 10 to operate in this way, controller 11 generates PMW original signal Dp, based on a difference between rotational speed/torque command Tsp and an actual rotational speed, through a proportional-integral-derivative (PID) control, and outputs the PMW original signal Dp. According to PMW original signal Dp, inverter circuit 14 switches a switching element mounted inside inverter circuit 14 and connected to a power supply, to generate and output driving signal Dry for each of the phases.

In the present exemplary embodiment, brushless motor control device 10 controls driving of brushless motor 40 without using a sensor such as a position sensor. In the present exemplary embodiment, current detection circuits 15 are provided to determine a position of the rotating rotor without using a sensor.

Each of current detection circuits 15 is disposed near a different one of driving signals Dry each for a different one of the phases and detects a value of a current in a different one of the U, V, and W phases, the currents flowing through coils 41, each of which is wound around the stator core of brushless motor 40. Current detection circuits 15 supply to controller 11 voltages Det each corresponding to a different one of the detected current values. As will be described in detail later, controller 11 includes an analog-digital (AD) converter circuit for converting the voltages Det to digital values, and calculates a rotated position and a rotational speed of the rotor, using the output data obtained through the AD conversion.

The present exemplary embodiment has a function of determining whether current detection circuit 15 and the AD converter circuits and the like are in an abnormal condition. In the present exemplary embodiment, brushless motor control device 10 includes RC filter 26 formed of resistor (R) and capacitor (C), to enable the determination.

Configurations of components included in brushless motor control device 10 are now described in greater detail.

To control driving of brushless motor 40 so that brushless motor 40 rotates in a desired way, controller 11 includes rotation controller 12, drive waveform generator 13, first AD converter circuit 221, second AD converter circuit 222, and third AD converter circuit 223 (hereinafter the first, second, and third AD converter circuits may be collectively referred to as "AD converter circuit 22"), motor position calculator 18, and actual rotational speed calculator 17. These components and inverter circuit 14 together configure a drive controller that generates driving signal Drv for driving brushless motor 40.

To perform digital processing, controller 11 includes clock generation circuit 23 for generating clock pulse Clk, which is a clock signal used in the digital processing, and timer circuit 24 for generating various timing signals, based on clock pulse Clk.

To determine whether AD converter circuits 22, clock generation circuit 23, and current detection circuit 15 are in an abnormal condition, controller 11 includes pulse output circuit 25, AD converter circuit diagnostic part 19, clock generation circuit diagnostic part 20, and current detection circuit diagnostic part 21.

In controller 11 configured as described above, AD converter circuits 22 each receive analog voltages via channels ch1 and ch2, convert the analog voltages to digital signals Dig1, Dig2, and Dig3, respectively, and output the converted signals. Channel ch1 is supplied with voltage Det corresponding to a current value detected by current detection circuit 15. First AD converter circuit 221 is supplied via channel ch1 with voltage DetU, which is voltage Det corresponding to a current value in the U-phase, and outputs digital signal Dig 1 indicating a digital value corresponding to voltage DetU. Second AD converter circuit 222 is supplied via channel ch1 with voltage DetV, which is voltage Det corresponding to a current value in the V-phase, and outputs digital signal Dig2 indicating a digital value corresponding to voltage DetV. Third AD converter circuit 223 is supplied via channel ch1 with voltage DetW, which is voltage Det corresponding to a current value in the W-phase, and outputs digital signal Dig1 indicating a digital value corresponding to voltage DetW. As will be described in detail later, channel ch2 of each of AD converter circuits 22 is supplied with determination voltage Vc for use in determining whether abnormality is occurring, from common RC filter 26.

Digital signals Dig 1 to 3 output from respective AD converter circuits 22 are supplied to motor position calculator 18. Motor position calculator 18 receives digital signals Dig 1 to 3 indicating a current value in the U, V, and W phases, respectively, and determines a position of the rotor included in brushless motor 40. In other words, in the present exemplary embodiment, motor position calculator 18 detects a rotated position of the rotor, based on current values detected in the phases. Motor position calculator 18 outputs, to actual rotational speed calculator 17 and drive waveform generator 13, rotor position signal Pd which is calculated as described above and indicates a position of the rotor.

In addition to rotor position signal Pd, actual rotational speed calculator 17 is notified by timer circuit 24 of timer count Cnt indicating a predetermined period of time Actual rotational speed calculator 17 uses timer count Cnt and rotor position signal Pd to calculate an actual rotational speed of brushless motor 40, based on an amount of change in a position of the rotor during the predetermined period of time Actual rotational speed calculator 17 outputs, to rotation controller 12, rotational speed signal Vd indicating the calculated rotational speed.

Rotation controller 12 performs, for example, proportional-integral-derivative (PID processing) arithmetic processing on a difference between rotational speed/torque command Tsp and rotational speed signal Vd, to generate drive waveform duty signal Dd according to a result of the arithmetic processing, and outputs the generated drive waveform duty signal Dd. Drive waveform generator 13 generates PMW original signal Dp for controlling the switching element of inverter circuit 14, based on drive waveform duty signal Dd and rotor position signal Pd, and outputs the generated PMW original signal Dp to inverter circuit 14.

As described above, in the present exemplary embodiment, rotational speed signal Vd, which indicates an actual rotational speed of the rotor, is generated based on current values detected by current detection circuits 15, and rotational speed/torque command Tsp, which indicates a specified speed at which the rotor is controlled to be rotated, is notified. Based on rotational speed signal Vd and rotational speed/torque command Tsp, a speed control loop for a feedback control is established by brushless motor control device 10 so that a rotational speed of the rotor follows the specified speed. Brushless motor control device 10 controls the rotation of brushless motor 40 by continuously executing the loop.

To execute the loop through digital processing, or to generate sampling timings for AD converter circuit 22, for example, controller 11 includes clock generation circuit 23 and timer circuit 24. Clock generation circuit 23 generates periodic clock pulse Clk serving as a reference operational period. Clock generation circuit 23 outputs clock pulse Clk to timer circuit 24 and digital processors of controller 11. Clock pulse Clk serves as a reference clock for controller 11. Timer circuit 24 operates using reference clock pulse Clk. Timer circuit 24 outputs trigger signals Trg1, Trg3 as sampling signals to AD converter circuits 22 at predetermined timings, and outputs trigger signals Trg2, Trg4 to pulse output circuit 25.

Specifically, timer circuit 24 includes a counter for counting clock pulse Clk. Timer circuit 24 outputs, as trigger signals Trg 1 to 4 or timer count Cnt, a pulse signal indicating a timing according to a predetermined count, using the counter.

More specifically, assume that, for example, a period of clock pulse Clk is set to 0.1 μS (i.e., a frequency of 10 MHz). Then, in timer circuit 24, a count for a High state of a pulse is set to 200, while a count for a Low state of the pulse is set to 800. Consequently, timer circuit 24 outputs a periodic pulse signal having a frequency of 10 KHz and is in a High state for 20 μS and in a Low state for 80 μS. Additionally, for example, AD converter circuits 22 use, as a sampling timing, a timing at which such a pulse signal rises from Low to High and a timing at which such a pulse signal falls from High to Low. For example, when the timing at which the pulse signal having a frequency of 10 KHz rises is used as the sampling timing for AD converter circuit 22, AD converter circuits 22 output digital signal Dig at 100 μS intervals. In the following description, as is generally known in digital processing, a pulse signal is a signal that varies between a High level and a Low level, with the High level being near a level of a voltage of positive power supply Vcc and the Low level being near a level of a voltage of a ground serving as a negative power supply.

A detailed description is now given of a configuration for determining whether AD converter circuits 22, clock generation circuit 23, and current detection circuits 15 are in an abnormal condition.

To enable the determination, RC filter 26 provided to brushless motor control device 10 includes resistor 27 and capacitor 28 connected in series. One end of resistor 27 is connected to pulse signal Pls for use in determining whether abnormality is occurring. Pulse signal Pls is output from pulse output circuit 25 of controller 11. One end of capacitor 28 is connected to ground 29. Intermediate connection point P between resistor 27 and capacitor 28 is connected as determination voltage Vc to channel ch2 of each of first, second, and third AD converter circuits 22. Pull-up resistor 30 of predetermined resistance is connected between positive power supply Vcc, which may be a 5-volt positive power supply, and intermediate connection point P.

AD converter circuits 22 each read determination voltage Vc, which is a voltage at intermediate connection point P of RC filter 26, at timings indicated by trigger signals Trg1, Trg3. After AD converter circuits 22 have read determination voltage Vc at the timings, timer circuit 24 outputs trigger signals Trg2, Trg4 to pulse output circuit 25. When inputting trigger signals Trg2, Trg4, pulse output circuit 25 changes a level of a signal to be output, to generate pulse signal Pls, and outputs pulse signal Pls to RC filter 26.

A description is now given of a diagnostic procedure performed by AD converter circuit diagnostic part 19 for determining whether AD converter circuits 22 are in an abnormal condition. Connecting pull-up resistor 30 to RC filter 26, as illustrated in FIG. 1, shifts a reference voltage at intermediate connection point P from 0 to V1. That is, at a timing when pulse signal Pls from pulse output circuit 25 is of Low level and a sufficient time has elapsed since charging of capacitor 28 is completed, a voltage at intermediate connection point P is a constant voltage obtained as a result of a voltage being divided between resistor 27 and pull-up resistor 30. Assume that, for example, positive power supply Vcc is of 5-volt, pull-up resistor 30 is of 4 KΩ, and resistor 27 is of 1 KΩ. When pulse signal Pls is of the Low level (i.e., 0-volts of ground 29), a voltage at intermediate connection point P, that is, determination voltage Vc, becomes 1 V as a result of a voltage of 5-volt positive power supply Vcc being divided. AD converter circuits 22 each convert, into a digital signal, determination voltage Vc at the timing when pulse signal Pls has been sufficiently at the Low level, and output the converted signals as digital signals Dig 1 to 3, respectively. If values of digital signals Dig 1 to 3 at the timing fall outside a predetermined range, AD converter circuit diagnostic part 19 determines that AD converter circuits 22 are in an abnormal condition.

More specifically, assume that for example, when AD converter circuits 22 operate normally, "128" is normally output as values of digital signals Dig 1 to 3 in response to a voltage of 1-volt being supplied to an input of each of AD converter circuits 22. For each of such AD converter circuits 22, a range of "120" to "140", which are either below or over the standard value "128", is set as a predetermined range. AD converter circuit diagnostic part 19 determines whether values of digital signals Dig 1 to 3 fall outside the range of "120" to "140". If so, AD converter circuit diagnostic part 19 determines that AD converter circuits 22 are in an abnormal condition.

FIG. 2A illustrates a waveform (upper side) of pulse signal Pls to be applied to RC filter 26, a waveform (lower side) of a capacitor voltage at intermediate connection point P, that is, determination voltage Vc, and timings at which AD converter circuits 22 read determination voltage Vc, the waveforms and the timings being obtained when the clock generation circuit is in a normal condition.

Pulse output circuit 25 is supplied with trigger signals Trg2, Trg4 from timer circuit 24. As illustrated in the upper side of FIG. 2A, pulse output circuit 25 outputs pulse signal Pls that switches from Low to High at a timing indicated by trigger signal Trg2 and that switches from High to Low at a timing indicated by trigger signal Trg4. Applying such pulse signal Pls to RC filter 26 causes capacitor 28 to undergo repeated charging and discharging, resulting in the waveform of determination voltage Vc, as illustrated in the lower side of FIG. 2A.

In the present exemplary embodiment, trigger signal Trg1 is output as a sampling timing to each of AD converter circuits 22 at timing C1 which is immediately before pulse signal Pls illustrated in FIG. 2A switches from Low to High. Timing C1 in FIG. 2A is a timing when a further sufficient time has elapsed since pulse signal Pls switches from High to Low. Therefore, AD converter circuits 22 can stably read determination voltage Vc equal to voltage V1 obtained as a result of a voltage being divided between resistor 27 and pull-up resistor 30. As described above, AD converter circuit diagnostic part 19 determines that respective AD converter circuits 22 are in an abnormal condition if digital signals Dig 1 to 3 which AD converter circuits 22 have read at timing C1 fall outside a predetermined range.

As described above, AD converter circuit diagnostic part 19 diagnoses an output value from each of a plurality of AD converter circuits 22, the output values each obtained from a voltage at intermediate connection point P which has been input to each of AD converter circuits 22 when pulse signal Pls to RC filter 26 is in a Low state. If any one of the diagnosed output values falls outside the predetermined range, AD converter circuit diagnostic part 19 determines that AD converter circuit 22 that has generated the output value outside the predetermined range is in an abnormal condition.

In the present exemplary embodiment, trigger signal Trg3 is output from timer circuit 24 as a sampling timing to each of AD converter circuits 22 at timing C2 which is immediately before pulse signal Pls switches from High to Low. Then, each of AD converter circuits 22 reads determination voltage Vc at intermediate connection point P of RC filter 26. Timing C2 is a timing when after pulse signal Pls switches to High, capacitor 28 has been charged using a time constant determined from resistance of resistor 27 and capacity of capacitor 28. At timing C2, AD converter circuits 22 can read determination voltage Vc equal to voltage V2 as illustrated in the lower side of FIG. 2A.

Meanwhile, as described above, trigger signals Trg 1 to 4 are generated by causing the counter to count clock pulse Clk. Accordingly, if clock pulse Clk is a periodic pulse having a period within a predetermined range, pulse signal Pls also has a waveform having a period within a predetermined range. Conversely, if the period of clock pulse Clk falls outside the predetermined range, the period of pulse signal Pls changes. For example, if the period of clock pulse Clk increases 10%, the period of pulse signal Pls increases 10%.

FIG. 2A illustrates timings obtained when the period of clock pulse Clk is within the predetermined range, that is, clock generation circuit 23 is in a normal condition. As illustrated, a waveform of determination voltage Vc is a sawtooth shape, with voltage V1 being a reference voltage and predetermined voltage V2 being a peak voltage. FIG. 2B illustrates an example in which clock generation circuit 23 is in an abnormal condition and the period of clock pulse Clk falls outside the predetermined range (FIG. 2B illustrates a case in which a clock frequency decreases).

With reference to FIGS. 2A and 2B, a description is now given of a diagnostic procedure performed by clock generation circuit diagnostic part 20 for determining whether clock generation circuit 23 is in an abnormal condition.

Assume that a condition of clock generation circuit 23 becomes abnormal as a result of a decrease in a clock frequency, which is a frequency of clock pulse Clk output from clock generation circuit 23. In that case, a frequency of pulse signal Pls also decreases as illustrated in FIG. 2B because pulse signal Pls is generated based on a count of clock pulse Clk. Consequently, a charging time of capacitor 28 increases, causing a waveform of determination voltage Vc to have its peak voltage above voltage V2, which determination voltage Vc has as its peak voltage when clock generation circuit 23 is in a normal condition. Conversely, if the frequency of the pulse signal increases, a waveform of determination voltage Vc has its peak voltage below voltage V2, which determination voltage Vc has as its peak voltage when clock generation circuit 23 is in a normal condition.

Accordingly, comparing the peak voltage with voltage V2, which determination voltage Vc has as its peak voltage when clock generation circuit 23 is in a normal condition, enables a diagnosis for determining whether clock generation circuit 23 is in a normal condition. As described above, trigger signals Trg 1 to 4 are generated by causing the counter to count clock pulse Clk. Accordingly, determination voltage Vc at timing C2 based on trigger signal Trg3 is a peak voltage of determination voltage Vc, regardless of variations in the clock frequency. For example, when the clock frequency is lower than a reference clock frequency, determination voltage Vc has its peak voltage above voltage V2, which determination voltage Vc has as a peak voltage when clock generation circuit 23 is in a normal condition, as illustrated in FIG. 2B.

Based on such a principle, clock generation circuit diagnostic part 20 determines that clock generation circuit 23 is in an abnormal condition if all of values of digital signals Dig 1 to 3 at timing C2 also fall outside a predetermined range. More specifically, assume that for example, when the clock frequency is normal, "240" is normally output as values of digital signals Dig 1 to 3 input at timing C2. For such clock generation circuit 23, a predetermined range of "230" to "250", which are either below or over the standard value "240" corresponding to voltage V2, is set. Clock generation circuit diagnostic part 20 determines whether each of values of digital signals Dig 1 to 3 falls within the range of "230" to "250". If all of the values of digital signals Dig 1 to 3 are determined to be less than "230", which is the lower limit of the predetermined range, or greater than "250", which is the upper limit of the predetermined range, that is, all of the values of digital signals Dig 1 to 3 fall outside the predetermined range, clock generation circuit diagnostic part 20 determines that clock generation circuit 23 is in an abnormal condition.

As described above, clock generation circuit diagnostic part 20 diagnoses an output value from each of AD converter circuits 22, the output values each obtained from a voltage at intermediate connection point P which has been input to each of AD converter circuits 22 when pulse signal Pls to RC filter 26 is in the High state. If the diagnosed output values are all greater than or less than the predetermined range, clock generation circuit diagnostic part 20 determines that the clock generation circuit is in an abnormal condition.

Note that, AD converter circuits 22 can also be diagnosed in the following way using values of digital signals Dig 1 to 3 at timing C2. In other words, in the present exemplary embodiment, three AD converter circuits 22 are provided. If an output value from one of AD converter circuits 22 is different from output values from the other two AD converter circuits 22, it can be determined that the one of AD converter circuits 22 is in an abnormal condition.

In other words, clock generation circuit diagnostic part 20 diagnoses an output value from each of the plurality of AD converter circuits 22, the output values each obtained from a voltage at intermediate connection point P which has been input to each of the plurality of AD converter circuits 22 when pulse signal Pls to RC filter 26 is in the High state. If only one of the diagnosed output values falls outside the predetermined range, clock generation circuit diagnostic part 20 determines that AD converter circuit 22 that has output the one of the diagnosed output values is in an abnormal condition. In this way, it can also be determined whether AD converter circuit 22 is in an abnormal condition.

Current detection circuit diagnostic part 21 determines whether current detection circuit 15 is in an abnormal condition, based on values of digital signals Dig 1 to 3 at a timing when brushless motor 40 is not operating. Specifically, at the timing when brushless motor 40 is not operating, AD converter circuits 22 each input voltage Det via channel ch1. Current detection circuit diagnostic part 21 receives digital signals Dig 1 to 3 corresponding to respective input voltages Det. Then, current detection circuit diagnostic part 21 determines whether current detection circuit 15 is in an abnormal condition, based on the values of digital signals Dig 1 to 3.

As described above, current detection circuit diagnostic part 21 diagnoses output values from the plurality of AD converter circuits, each of the output values being obtained from a different one of output voltages each of which is supplied from a different one of current detection circuits 15 and is input to a different one of the plurality of AD converter circuits when brushless motor 40 is not operating. If any one of the diagnosed output values falls outside a predetermined range, current detection circuit diagnostic part 21 determines that a current detection circuit that has generated the output value outside the predetermined range is in an abnormal condition.

When AD converter circuit diagnostic part 19, clock generation circuit diagnostic part 20, and current detection circuit diagnostic part 21 each diagnose a corresponding circuit as being in an abnormal condition, AD converter circuit diagnostic part 19, clock generation circuit diagnostic part 20, and current detection circuit diagnostic part 21 each output error stop signal Err to rotation controller 12 so that brushless motor 40 stops rotating. Alternatively, a request signal for repair or replacement may be output to notify a user of abnormality.

The example configuration of controller 11 has been described that includes functional blocks such as a digital circuit. However, for example, a configuration is possible in which processes are performed based on a processing procedure such as a program. Specifically, for example, a program for executing a rotation control processing method and a program for executing a diagnostic processing method are stored on a memory. The program for executing the rotation control processing method includes, for example, functions of motor position calculator 18, actual rotational speed calculator 17, rotation controller 12, and drive waveform generator 13. The program for executing the diagnostic processing method includes functions of AD converter circuit diagnostic part 19, clock generation circuit diagnostic part 20, and current detection circuit diagnostic part 21. The programs are executed by a microcomputer. The present exemplary embodiment can also be achieved in this way. Controller 11 including clock generation circuit 23 for generating a reference clock for a microcomputer and AD converter circuit 22, together with a function of the microcomputer, can be included in one chip, using large-scale integration (LSI).

Figure 3:
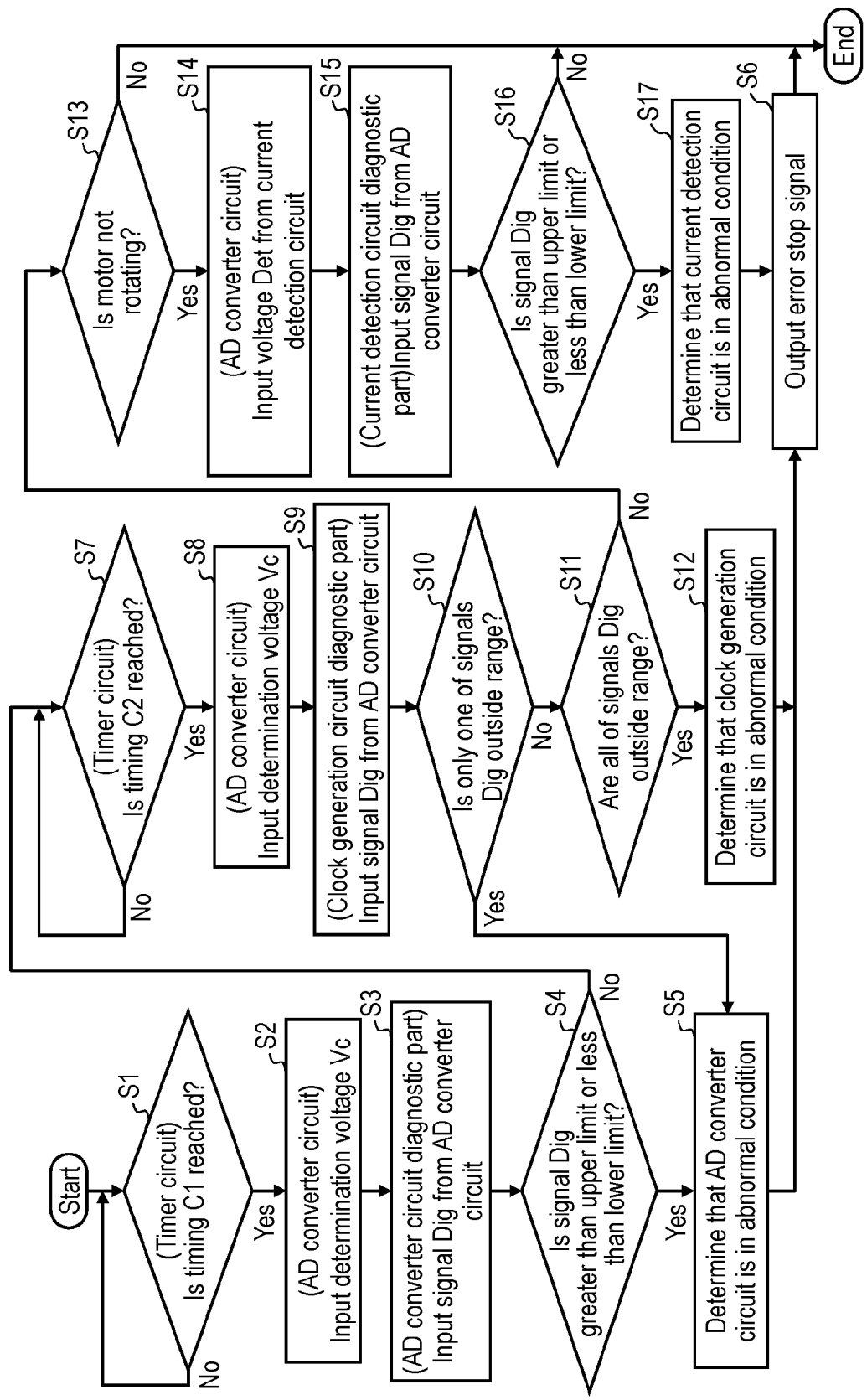
FIG. 3 is a flowchart of a diagnostic procedure for determining whether abnormality is occurring, according to the brushless motor control device.

FIG. 3 is a flowchart illustrating steps in the diagnostic processing method for the brushless motor control device according to the present exemplary embodiment.

With reference to FIG. 3, a description is now given of an example in which the diagnostic processes, which are performed by clock generation circuit diagnostic part 20, AD converter circuit diagnostic part 19, and current detection circuit diagnostic part 21 described above, constituted by the steps in the diagnostic processing method are performed by controller 11.

Basically, as described above, in the diagnostic processing method for the brushless motor control device, resistor 27 and capacitor 28 are connected in series to form RC filter 26, and pull-up resistor 30 connecting to predetermined power supply Vcc is connected to intermediate connection point P between resistor 27 and capacitor 28, with intermediate connection point P further connected to AD converter circuits 22. Then, pulse signal Pls generated based on clock pulse Clk is applied to RC filter 26, and a voltage at intermediate connection point P is converted to digital signal Dig by each of the plurality of AD converter circuits 22. In the diagnostic processing method, AD converter circuits 22 and clock generation circuit 23 are diagnosed, based on the output values obtained through the conversion. More specifically, the diagnostic processes are performed by executing the following steps.

First, controller 11 refers to a timing generated by timer circuit 24 and determines whether a timing at which AD converter circuits 22 are diagnosed, that is, timing C1, is reached (step S1). If timing C1 is determined to be reached, AD converter circuits 22 each read determination voltage Vc (step S2).

AD converter circuit diagnostic part 19 receives, from AD converter circuits 22, digital signals Dig 1 to 3 read at timing C1 (step S3), and determines whether any one of values of digital signals Dig 1 to 3 is greater than a predetermined upper limit or less than a predetermined lower limit (step S4).

If any one of the values is determined to fall outside the predetermined range in step S4, AD converter circuit diagnostic part 19 determines that AD converter circuit 22 that has output the value outside the predetermined range is in an abnormal condition (step S5), and outputs error stop signal Err (step S6). If all of the values fall within the predetermined range in step S4, the process proceeds to step S7.

In step S7, controller 11 refers to the timing generated by timer circuit 24, and determines whether a timing at which clock generation circuit 23 is diagnosed, that is, timing C2, is reached (step S7). If timing C2 is determined to be reached, AD converter circuits 22 each read determination voltage Vc (step S8). Clock generation circuit diagnostic part 20 receives, from AD converter circuits 22, digital signals Dig 1 to 3 read at timing C2 (step S9).

Clock generation circuit diagnostic part 20 determines whether a value of only one of digital signals Dig 1 to 3 falls outside the predetermined range (step S10).

If a value of only one of digital signals Dig 1 to 3 is determined to fall outside the predetermined range in step S10, clock generation circuit diagnostic part 20 determines that AD converter circuit 22 that has output the value outside the predetermined range is in an abnormal condition (step S5), and outputs error stop signal Err (step S6). If AD converter circuits 22 are determined to be in a normal condition in step S10, the process proceeds to step S11.

In step S11, clock generation circuit diagnostic part 20 determines whether values of all of digital signals Dig 1 to 3 are greater than or less than the predetermined range (step S11).

If the values of all of digital signals Dig 1 to 3 are determined to fall outside the predetermined range in step S11, AD converter circuit diagnostic part 19 assumes that a frequency of clock generation circuit 23 decreases or increases, determines that clock generation circuit 23 is in an abnormal condition (step S12), and outputs error stop signal Err (step S6). If clock generation circuit 23 is determined to be in a normal condition in step S11, the process proceeds to step S13.

In step S13, controller 11 determines whether brushless motor 40 is rotating (step S13). At a timing when brushless motor 40 is not operating, AD voltages DetU, DetV, and DetW, each of which is output from a different one of current detection circuits 15, are each input to a different one of AD converter circuits 22 (step S14).

Current detection circuit diagnostic part 21 receives, from AD converter circuits 22, digital signals Dig 1 to 3 read at the timing when brushless motor 40 is not operating (step S15), and determines whether any one of values of the digital signals Dig 1 to 3 is greater than the predetermined upper limit or less than the predetermined lower limit (step S16).

If any one of the values of the digital signals Dig 1 to 3 is determined to fall outside the predetermined range in step S16, current detection circuit diagnostic part 21 determines that current detection circuit 15 is in an abnormal condition (step S17), and outputs error stop signal Err (step S6) to cause brushless motor 40 to stop rotating. If current detection circuit 15 is determined to be in a normal condition in step S16, the process ends. If brushless motor 40 is determined to be operating in step S13, rotation of brushless motor 40 is controlled as described above.

With the above-described brushless motor control device applied to controlling a cooling fan, errors in a rotational speed and torque can be prevented from increasing due to an abnormal condition of AD converter circuits, a clock generation circuit, and a current detection circuit. Accordingly, variations in an airflow of the cooling fan and a driving sound emitted by the cooling fan can be prevented. Consequently, a large motor does not need to be used for the cooling fan to make allowance for the variations, achieving reduction in both size and weight for the cooling fan.

Additionally, the brushless motor control device of the present invention can be easily achieved by using a small microcomputer, which has fewer pins, instead of adding a plurality of complex diagnostic circuits, thus limiting costs of circuits.

INDUSTRIAL APPLICABILITY

The brushless motor control device according of the present invention has a simple configuration and performs speed control and torque control with high accuracy. The brushless motor control device is applicable to domestic or industrial motors, and particularly suitable for use in controlling a cooling fan or a blower for which a low noise is demanded.

The invention claimed is:
1. A brushless motor control device for controlling and driving of a brushless motor so that the brushless motor rotates according to an external command, the brushless motor control device comprising:

a drive controller for generating a driving signal for driving the brushless motor;

a plurality of current detection circuits each detecting a current value in each of phases of the brushless motor;

a plurality of AD converter circuits each connected to a different one of the current detection circuits each for a different one of the phases;

a clock generation circuit for outputting a clock pulse serving as a reference operational period;

a pulse output circuit for outputting a pulse signal based on the clock pulse; and an RC filter for inputting the pulse signal, wherein the RC filter is formed of a resistor and a capacitor connected in series, a pull-up resistor connecting to a predetermined power supply is connected to an intermediate connection point between the resistor and the capacitor, and the intermediate connection point is connected to the plurality of AD converter circuits.

2. The brushless motor control device according to claim 1, wherein in a case where the pulse signal to the RC filter is in a Low state and any one of output values from the plurality of AD converter circuits falls outside a predetermined range, each of the output values being obtained based on a voltage at the intermediate connection point which has been input to each of the plurality of AD converter circuits, an AD converter circuit that has generated the output value outside the predetermined range is determined to be in an abnormal condition.

3. The brushless motor control device according to claim 1, wherein in a case where the pulse signal to the RC filter is in a High state and only one of the output values from the plurality of AD converter circuits falls outside the predetermined range, each of the output values being obtained based on a voltage at the intermediate connection point which has been input to each of the plurality of AD converter circuits, an AD converter circuit that has generated the output value outside the predetermined range is determined to be in an abnormal condition.

4. The brushless motor control device according to claim 1, wherein in a case where the pulse signal to the RC filter is in the High state and all of the output values from the plurality of AD converter circuits are greater than or less than the predetermined range, each of the output values being obtained based on a voltage at the intermediate connection point which has been input to each of the plurality of AD converter circuits, the clock generation circuit is determined to be in an abnormal condition.

5. The brushless motor control device according to claim 1, wherein in a case where the brushless motor is not rotating and any one of the output values from the plurality of AD converter circuits falls outside the predetermined range, each of the output values being obtained based on outputs supplied from the current detection circuits and input to the plurality of AD converter circuits, the current detection circuit is determined to be in an abnormal circuit.

6. A diagnostic processing method of a brushless motor control device for controlling and driving of a brushless motor so that the brushless motor rotates according to an external command, the brushless motor control device including:

a drive controller for generating a driving signal for driving a brushless motor;

a plurality of current detection circuits each detecting a current value in each of phases of the brushless motor;

a plurality of AD converter circuits each connected to a different one of the current detection circuits each for a different one of the phases; and a clock generation circuit for outputting a clock pulse serving as a reference operational period, the diagnostic processing method diagnosing the brushless motor control device to determine whether the brushless motor control device is in an abnormal condition, comprising:

configuring an RC filter formed of a resistor and a capacitor connected in series;

connecting a pull-up resistor connected to a predetermined power supply to an intermediate connection point between the resistor and the capacitor;

connecting the intermediate connection point to the plurality of AD converter circuits;

applying a pulse signal generated based on the clock pulse to the RC filter; and diagnosing the plurality of AD converter circuits and the clock generation circuits based on output values which are digital signals converted by the plurality of AD converter circuits from voltages at the intermediate connection point.

7. The brushless motor control device according to claim 2, wherein in a case where the pulse signal to the RC filter is in a High state and only one of the output values from the plurality of AD converter circuits falls outside the predetermined range, each of the output values being obtained based on a voltage at the intermediate connection point which has been input to each of the plurality of AD converter circuits, an AD converter circuit that has generated the output value outside the predetermined range is determined to be in an abnormal condition.

8. The brushless motor control device according to claim 2, wherein in a case where the pulse signal to the RC filter is in the High state and all of the output values from the plurality of AD converter circuits are greater than or less than the predetermined range, each of the output values being obtained based on a voltage at the intermediate connection point which has been input to each of the plurality of AD converter circuits, the clock generation circuit is determined to be in an abnormal condition.

9. The brushless motor control device according to claim 2, wherein in a case where the brushless motor is not rotating and any one of the output values from the plurality of AD converter circuits falls outside the predetermined range, each of the output values being obtained based on outputs supplied from the current detection circuits and input to the plurality of AD converter circuits, the current detection circuit is determined to be in an abnormal circuit.

* * * * *